United States Patent
Heroufosse et al.

(10) Patent No.: US 7,919,128 B2
(45) Date of Patent: Apr. 5, 2011

(54) EARTH ALKALI (HYDR)OXIDE FOR PREVENTING CAKING OF POWDERED EMULSIFIERS

(75) Inventors: François Heroufosse, Walhain (BE); Emmanuel Vanzeveren, Brussels (BE)

(73) Assignee: Puratos Naamloze Vennoostschap, Groot-Bijgaarden (BE)

( * ) Notice: Subject to any disclaimer, the term of this patent is extended or adjusted under 35 U.S.C. 154(b) by 1291 days.

(21) Appl. No.: 10/474,094

(22) PCT Filed: Mar. 15, 2002

(86) PCT No.: PCT/BE02/00037
§ 371 (c)(1),
(2), (4) Date: Apr. 5, 2004

(87) PCT Pub. No.: WO02/081072
PCT Pub. Date: Oct. 17, 2002

(65) Prior Publication Data
US 2004/0166215 A1 Aug. 26, 2004

(30) Foreign Application Priority Data
Apr. 9, 2001 (EP) .................................. 01870078

(51) Int. Cl.
*A23L 1/30* (2006.01)
*A61K 47/00* (2006.01)

(52) U.S. Cl. ............................. 426/74; 424/439; 426/97

(58) Field of Classification Search .................. 131/276; 426/98, 103, 471, 613, 658, 564; 568/27, 568/458, 496; 424/241, 243, 264, 305; 167/65; 149/7; C01B 25/34, 33/24

See application file for complete search history.

(56) References Cited

U.S. PATENT DOCUMENTS

| 3,116,185 | A |   | 12/1963 | Wilson et al. |         |
|-----------|---|---|---------|---------------|---------|
| 3,166,475 | A | * | 1/1965  | Fiordalisi    | 514/404 |
| 3,883,489 | A | * | 5/1975  | Matschke et al. | 524/427 |
| 4,164,593 | A |   | 8/1979  | Marnett et al. |        |
| 4,242,364 | A | * | 12/1980 | Buddemeyer et al. | 426/98 |
| 4,284,630 | A | * | 8/1981  | Yu et al.     | 514/179 |
| 4,826,699 | A |   | 5/1989  | Soe           |         |
| 4,996,196 | A | * | 2/1991  | Mitsuhashi et al. | 514/53 |
| 5,066,511 | A | * | 11/1991 | Cherukuri et al. | 426/658 |
| 5,658,609 | A | * | 8/1997  | Abboud et al. | 426/609 |
| 5,782,951 | A |   | 7/1998  | Aylen et al.  |         |
| 6,241,994 | B1 | * | 6/2001 | Lee et al.    | 424/408 |
| 6,309,663 | B1 | * | 10/2001| Patel et al.  | 424/450 |

FOREIGN PATENT DOCUMENTS

| GB | 1113613 | * | 5/1968 |
|----|---------|---|--------|
| GB | 2 140 454 A |   | 11/1984 |

OTHER PUBLICATIONS

Handbook of Pharmaceutical Excipients; American Pharmaceutical Assoc. (1986), pp. 225-227 (Tweens).*

* cited by examiner

*Primary Examiner* — Robert A Wax
*Assistant Examiner* — Jeffrey T Palenik
(74) *Attorney, Agent, or Firm* — Knobbe Martens Olson & Bear LLP

(57) ABSTRACT

Disclosed is a powdered composition including an emulsifier and at least one anti-caking additive selected from the group consisting of earth alkali oxides, earth alkali hydroxides or a mixture thereof. Further disclosed is a method for preventing caking of a powdered composition comprising emulsifiers.

11 Claims, 2 Drawing Sheets

EARTH ALKALI (HYDR)OXIDE FOR PREVENTING CAKING OF POWDERED EMULSIFIERS

This application is U.S. National Phase of International Application PCT/BE02/00037, filed Mar. 15, 2002 designating the U.S., and published in English as WO 02/081072 on Oct. 17, 2002, which claims priority to European Patent Application No. 01870078.1 filed Apr. 9, 2001.

FIELD OF THE INVENTION

The present invention relates to new additives for preventing caking of powdered emulsifiers and enhancing anti-caking performances of usual anti-caking additives, resulting in a free-flowing powder and a strong or complete reduction of aggregate's occurrence.

The possible applications of the present invention concern food industry, cosmetic industry and pharmacy industry.

DESCRIPTION OF THE PRIOR ART

Caking Problem Description

Some powdered surfactants and emulsifiers used in the food industry, but also in cosmetics or pharmacy show a tendency to agglomerate with time, even when granulated in small beads. Those emulsifiers are esters of alcohol or polyol with fatty acids manufactured through transesterification or direct esterification and are based on fatty acids in the range C12 or C22.

Most of the time the problem of agglomeration (also hereafter referred to as caking) is found with esters based on partially or fully saturated fatty acids, as the unsaturated products will remain liquid or pasty at room temperature. Emulsifiers are put in powder form through spray cooling, spray chilling, grinding or milling or any other method. These fatty acids are from vegetable or animal origin like lard, tallow, palm, soya, rapeseed or others and are added under the form of triacylglycerols in the case of esters produced through transesterification or as fatty acids of various purity regarding chain length in the case of direct esterification.

Examples of emulsifiers are monodiglycerides, sorbitan esters, esters of lactic acids and lactylates. Some of them can be further purified (ex: distilled monoglycerides) or reacted (ex: ethoxilation of sorbitan ester, esterification of monoglycerides with food acids). They can also be diluted with fat or triacylglycerols.

A particular product is DATEM, or DiAcetylated Tartaric Acid Esters of Monoglycerides that has a big tendency to cake. DATEM or DATA-esters are blends of different reaction products between the monoglyceride and the diacetylated tartaric acid (anhydride) and their composition has been described in different publications (ex: Köhler, Grosch, Study of the effect of DATEM, J. Agric. Food Chem. 1999, 47, 1863-1869). They are commercially available as food additives and labelled as E472e or E472f depending on their composition. The composition and the fatty acid profile will influence the tendency to show caking problems, but DATA esters will cake most of the time. The most important application is bread improver or a compound comprised therein. Other applications like vegetable creams or cosmetic products have also been reported.

SSL, Sodium Stearoyl Lactylate (E481) is another example of emulsifier showing caking problems.

Caking results in hardening of the powder contained in the packaging (bags, boxes, Big Bags . . . ) and is the cause of many troubles and economical losses. Caked powders are not suitable for further blending or cannot be properly discharged in automated installations. The products must then be processed with a hammer mill, or remelted, or simply thrown away. Caking can occur at low temperature, room temperature or at elevated temperature depending on emulsifier type and composition. Most of the time a higher temperature will result in a more pronounced caking problem, as products will start melting and possible physical or chemical processes linked to caking phenomena will be enhanced.

STATE OF THE ART

Today most producers use carriers or anti-caking additives in order to avoid caking of the powder. Examples of anti-caking additives are wheat flour, native starch, carbonates of calcium, phosphates (tricalcium phosphate), silicium dioxide, calcium silicate, and others. Those additives are not equal in efficiency and are usually used at 1-5% w/w on the emulsifier for the silicium compounds, and usually used between 1 and 20% w/w or more for the other anti-caking additives. However, the efficiency is not satisfactory in many cases and they only can reduce the extend of the problem rather than suppress it.

AIMS OF THE INVENTION

The present invention aims to provide new anti-caking additives for powdered emulsifiers and compositions, especially food or feed compositions comprising them.

In particular, the present invention aims to provide additives with better anti-caking efficiency, namely at high temperature, when compared to additives of the state of the art.

The present invention aims to provide new additives which reduce or suppress not only the caking phenomena but also the chemical and physical phenomena related thereto.

SUMMARY OF THE INVENTION

The present invention is related to a powdered composition such as a food additive comprising a powdered emulsifier and at least one anti-caking additive, selected from the group consisting of earth alkali oxides, earth alkali hydroxides or a mixture thereof, preferably the following alkaline earth oxides and hydroxides: MgO, CaO, Mg(OH)$_2$, Ca(OH)$_2$, Mg(OH)$_2$.Ca(OH)$_2$ or a mixture thereof.

Advantageously, said anti-caking agent is present in an amount of at least 0.1% by weight of the total composition, preferably at least 0.5% by weight of the total composition, more preferably at least 1% by weight of the total composition.

In said composition, the emulsifier is advantageously a food emulsifier selected from the group consisting of DATEM, DATA, SSL as well as their derivatives and other food surfactants based on esters of alcohol and fatty acids, surfactants based on ester of polyols, and fatty acids or a mixture thereof.

Furthermore, the composition according to the invention may further comprise a known "classical anti-caking additive" preferably selected from the group consisting of Ca(CO)$_3$, Ca$_3$(PO$_4$)$_2$ (or TCP), SiO$_2$, starch, wheat, flour, etc.

In the composition according to the invention, the ratio between the new anti-caking additive and the known classical anti-caking additive is comprised between 1 to 50% W/W on the emulsifier in the composition according to the invention, the total of the composition being 100%.

Thus, the granularity has an impact on the efficiency, the anti-caking additive has a bulk density below 1 kg/l, preferably a density below 0.6 kg/l, more preferably a density below 0.35 kg/l, more specifically a density below 0.15 kg/l; said density, having always a density higher than 0.01 kg/l.

Another aspect of the present invention is related to a food or feed composition comprising the specific composition according to the invention and the usual food ingredients as well as to a pharmaceutical composition or a cosmetic composition comprising an adequate pharmaceutical carrier or cosmetic carrier with the composition according to the invention.

A further aspect of the present invention is related to a method for preventing caking of powdered compositions comprising emulsifiers and possibly classical anti-caking additives, said method comprising the step of adding to said powder composition a new anti-caking additive selected from the group consisting of mineral oxides, mineral hydroxides or a mixture thereof, preferably consisting of MgO, CaO, $Mg(OH)_2$, $Ca(OH)_2$, $Mg(OH)_2.Ca(OH)_2$ or a mixture thereof. In said method, the known classical anti-caking additives and the emulsifiers are the ones described hereabove.

A last aspect of the present invention is related to the use of a compound selected from the group consisting of mineral oxides, mineral hydroxides or a mixture thereof, preferably MgOH, CaOH, $Mg(OH)_2$, $Ca(OH)_2$, $Mg(OH)_2.Ca(OH)_2$ or a mixture thereof as an anti-caking additive for compositions comprising emulsifiers, preferably a food emulsifier as above described.

The present invention will be described in detail in the following non-limiting examples in reference to the enclosed figures.

SHORT DESCRIPTION OF THE DRAWINGS

DETAILED DESCRIPTION OF THE INVENTION

While using different carriers in experiments for caking reduction, it was surprisingly found that some materials could reduce or suppress caking completely when used alone or combined with known "classic" anti-caking additives. This is also the case at high temperatures (37° C.), close to the melting temperature of the product. A superior result compared with the use of "classical" anti-caking additive could be achieved.

Those compounds are mineral oxides and mineral hydroxides or mixed oxides and hydroxides or mixed hydroxides of different cations, namely oxides of alcaline earths like magnesium oxide, calcium oxide, magnesium hydroxide, calcium hydroxide, mixed hydroxides of calcium and magnesium. They can occur as the result of different processes and can also be described as quicklime™, dolime™, hydrate lime, hydrated dolomite etc . . . When used in powder form, alone or in combination with other anti-caking additives, those materials suppress the caking problem in different conditions of temperature and time storage of the powders.

Advantageously, said alcaline substances interact with free acids like acetic acid released during storage and can neutralise them. As acids like acetic acid can act as a solvant for emulsifiers, their neutralisation reduces this solvent effect, so that the emulsifier remains in completely solid state and unexpectedly does not agglomerate.

Acidity is released with time in emulsifiers due to some chemical instability or hydrolyses. This process can increase with temperature and continues with time in such a way that free acids are released in the product. This can in turn promote contact between molecules and chemical reactions. It is generally accepted that intra and intermolecular chemical bounds can be formed, resulting in an increased agglomeration of the product. The neutralisation of the acids which reduce the free acidity as explained above and make the control of the caking process feasible.

In order to support this hypothesis, the alcalinity of different anti-caking additives was measured in aqueous solution. Different types of carbonates (Reverté BL50, Spain; Solvay Socal™ 31, France; Scora, France) are first neutralised with HCl 0.5M, then aqueous solutions of blends of carbonate with MgO (Merck, Germany), CaO (Carmeuse, Belgium) or $Mg(OH)_2.Ca(OH)_2$ (Group Lhoist Type S™, Belgium) are neutralised with HCl 4M for MgO and CaO or with HCl 0.5M for the Type S™. A concentration of 100 g/l is used in the case of the pure carbonates; a concentration of 10 g/l is used for the blends carbonate-oxide or hydroxide.

Figure 1:
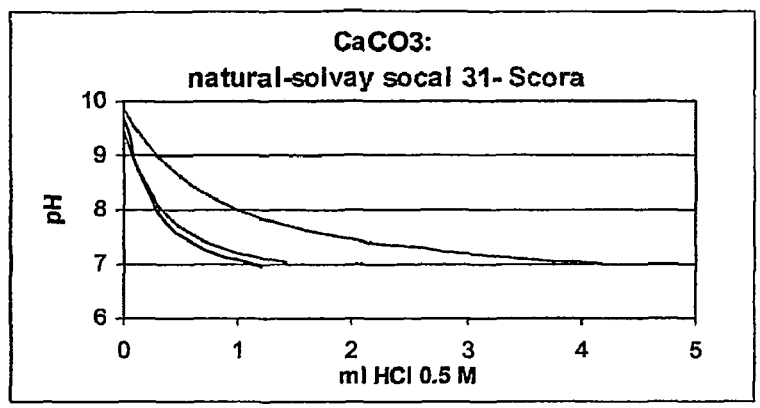
FIG. 1 represents the neutralisation profiles with a HCl 0.5M solution of different aqueous solutions containing three different carbonates, more precisely, natural $CaCO_3$, Solvay Socal™ 31 carbonate and Scora carbonate.
Figure 2:
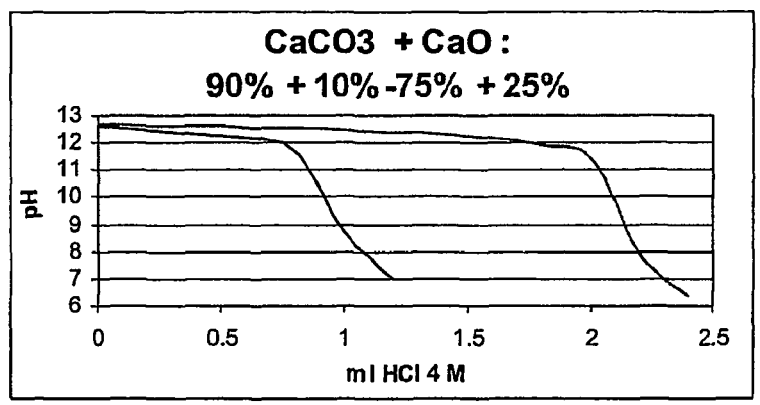
FIG. 2 represents the neutralisation profiles with a HCl 4M solution of two aqueous solutions containing $CaCO_3$ and CaO in two different ratios, 90%:10% and 75%:25%.
Figure 3:
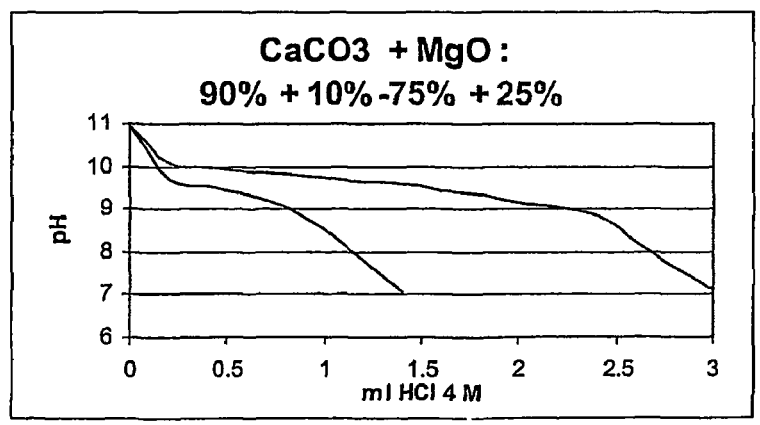
FIG. 3 represents the neutralisation profiles with a HCl 4M solution of two aqueous solutions containing $CaCO_3$ and MgO in two different ratios, 90%:10% and 75%:25%.
Figure 4:
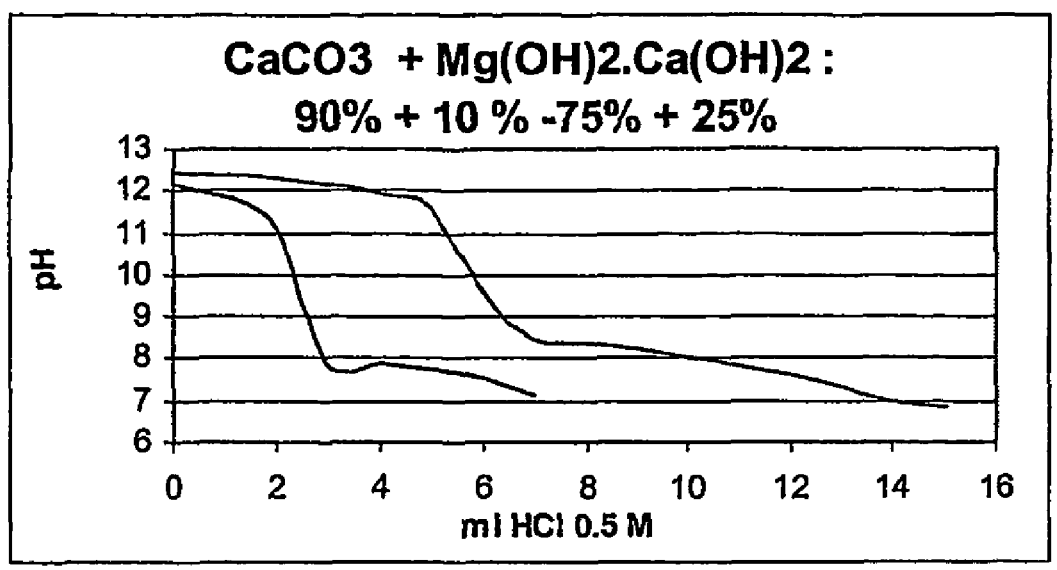
FIG. 4 represents the neutralisation profiles with a HCl 0.5M solution of two aqueous solutions containing $CaCO_3$ and $Mg(OH)_2.Ca(OH)_2$ in two different ratios, 90%:10% and 75%:25%.

Concentrations are adapted in order to make the neutralisation curve easier to read, but identical concentrations can be used as well. The blends are neutralised in two ratios each time: 90% carbonate w/w and 75% carbonate w/w, the resting fraction being MgO, CaO or the mixed hydroxide. Curves are presented in the enclosed FIGS. 1 to 4.

From the neutralisation profiles it can be derived that the alcalinity is advantageously increased when MgO, CaO or $Mg(OH)_2.Ca(OH)_2$ is used. This is also clear, when Scora carbonate is compared to standard carbonates: the latter contains up to 8% of MgO or Mg(OH)2, giving a similar effect than the addition of MgO. Table 1 gives the neutralisation equivalent for identical concentrations of the different blends (this conversion is based on calculation).

TABLE 1 comparison of neutralisation for identical concentrations

| Blend | Concentration of blend in solution | Used mol of HCl for neutralisation | Mol HCl for 100 g/l |
|---|---|---|---|
| $CaCO_3$ (natural) | 100 g/l | 0.5 × 10e−3 | 0.5 × 10e−3 |
| $CaCO_3$—MgO (90–10 w/w) | 10 g/l | 5.6 × 10e−3 | 56 × 10e−3 |
| $CaCO_3$—CaO (90–10 w/w) | 10 g/l | 4.8 × 10e−3 | 48 × 10e−3 |
| $CaCO_3$—Ca(OH)2.Mg(OH)2 (90–10 w/w) | 10 g/l | 3.6 × 10e−3 | 36 × 10e−3 |

As illustration, a DATEM was blended with calcium carbonate purchased from Reverté at one end and with a blend of calcium carbonate and Magnesium Oxide purchased form Merck (75/25% w/w) on the other end. Both samples were exposed to temperature (37° C.) for 5 days and the acid value was measured (acid value is a measure of free acidity, expressed in mg KOH needed to neutralise 1 g of emulsifier).

The blend with carbonate showed an acid value of 50 mg KOH/g and was caked and the blend with $CaCO_3/MgO$ had an acid value of 20 mg KOH/g. The latter was still in powder form.

In further trials, it was found that the granulometry of the added mineral has an impact on the efficiency. If the bulk density of the powder is taken as a measure of the particle size, then it is found for MgO that a density below 1 kg/l is needed, that a density below 0.6 kg/l is prefered and that a density lower than 0.35 kg/l is giving better results and that a density below 0.15 kg/l is giving optimal results.

EXAMPLES

Example 1

In a first example a DATEM, corresponding to the commercial product available from Beldem sa (Puratos Group) under the trade name Multec Data 2720S™, is used with no carrier for a caking experiment. This product is based on palm hydrogenated fat and has a saponification value of ca 450 mg KOH/g and an acid value of ca 80 mg KOH/g; the melting range is 35-56° C.

This powder is then blended with a calcium carbonate from natural origin (purchased from Reverte BL 50) in a ratio 80/20 w/w (Blend A).

The powder can also be mixed with a blend of the same carbonate and magnesium oxide MgO purchased from Merck. The ratio is 90% calcium carbonate and 10% MgO (Blend B).

The two blends are exposed to a temperature of 37° C. during 5 days and then checked for caking.

The visual evaluation is conducted by a trained pannel of 4 members and consists in giving a score to the sample under evaluation. The following definition is used for the scoring (table 2):

TABLE 2

| definition of scores | |
|---|---|
| Score | Definition |
| 0/10 | Product is a hard block, consisting in one piece; no powder characteristic anymore. |
| 0/10 <, = 2/10 | One breakable block with the hand, resulting in a few fragments |
| 2/10 <, = 4/10 | Hard, big agglomerates (>3 cm length or diameter), breakable under high manual pression |
| 4/10 <, = 6/10 | Medium size agglomerates (1 < 5 cm), easy to break with the hand |
| 6/10 <, = 8/10 | Small, soft agglomerates in the powder |
| 9/10 | A few small and soft agglomerates in the powder |
| 10/10 | No agglomerates, free flowing powder |

The first blend has become hard and consists now of one block of DATEM. The powder characteristic has completely disappeared and such a product is not suitable for further mixing or blending.

The second blend, containing MgO (2% w/w on the total product) is still a powder with some agglomerates.

When the products are ranked on the scoring scale defined above, Blend A receives a score of 0/10 and blend B receives a score of 7/10.

TABLE 3

| | Blend A | Blend B |
|---|---|---|
| DATEM type | Multec Data 2720 S ™ | Multec Data 2720 S ™ |
| Basestock | Palm fat, hydrogenated | Palm fat, hydrogenated |
| Total carrier content | 20% w/w | 20% w/w |
| Natural $CaCO_3$ content | 20% w/w | 18% w/w |
| MgO content | 0% | 2% |
| Aspect | Block | Powder with soft, small agglomerates |
| Caking score | 0/10 | 7/10 |

A new series of blends is realised based on the same emulsifier. The same conditions are used for blending and exposure to temperature. Results are summarised in table 4.

TABLE 4

| | Blend C | Blend D |
|---|---|---|
| DATEM type | Multec Data 2720 S ™ | Multec Data 2720 S ™ |
| Basestock | Palm fat, hydrogenated | Palm fat, hydrogenated |
| Total carrier content | 20% w/w | 20% w/w |
| Natural $CaCO_3$ content | 20% w/w | 15% w/w |
| MgO content | 0% | 5% |
| Aspect | Block | Fine, fluid powder |
| Caking score | 0/10 | 9/10 |

Example 2

A new series of blends is realised based on the same emulsifier. The same conditions are used for blending and exposure to temperature. Results are summarised in table 5.

Here a fine, precipitated calcium carbonate (purchased form Scora, France) is compared with magnesium oxide. PCC are more efficient than natural carbonates as anti-caking additives due to their fineness and/or to their higher reactivity.

TABLE 5

| | Blend E | Blend F |
|---|---|---|
| DATEM type | Multec Data 2720 S ™ | Multec Data 2720 S ™ |
| Basestock | Palm fat, hydrogenated | Palm fat, hydrogenated |
| Total carrier content | 20% w/w | 20% w/w |
| Natural $CaCO_3$ content | 0% | 15% w/w |
| Precipitated $CaCO_3$ content | 20% w/w | 0% |
| MgO content | 0% | 5% |
| Aspect | Powder with hard agglomerates | Fine, fluid powder |
| Caking score | 3/10 | 10/10 |

Example 3

A new series of blends is realised based on the same emulsifier. The same conditions are used for blending and exposure to temperature. Results are summarised in table 6.
Here a natural calcium carbonate is compared with Mg(OH)2.Ca(OH)2, (type S™ from Group Lhoist, Belgium).

TABLE 6

|  | Blend G | Blend H |
|---|---|---|
| DATEM type | Multec Data 2720 S ™ | Multec Data 2720 S ™ |
| Basestock | Palm fat, hydrogenated | Palm fat, hydrogenated |
| Total carrier content | 20% w/w | 20% w/w |
| Natural CaCO$_3$ content | 20% | 15% w/w |
| Mg(OH)2.Ca(OH)2 content | 0% | 5% |
| Aspect | Hard block | Presence of small, soft agglomerates |
| Caking score | 0/10 | 7/10 |

Example 4

A new series of blends is realised based on the same emulsifier. The same conditions are used for blending and exposure to temperature. Results are summarised in table 7 and 8.

In this example the influence of the bulk density (as an indirect measurement for particle size) of MgO is illustrated. MgO from Lohman (Germany) with following bulk densities is used: 0.2 kg/l (blend J), 0.15 kg/l (blend K), 0.08 kg/l (blend L). The different blends contain 18% CaCO$_3$ and 2% MgO.

TABLE 7

|  | Blend I | Blend J |
|---|---|---|
| DATEM type | Multec Data 2720 S ™ | Multec Data 2720 S ™ |
| Basestock | Palm fat, hydrogenated | Palm fat, hydrogenated |
| Total carrier content | 20% w/w | 20% w/w |
| Natural CaCO$_3$ content | 20% | 18% w/w |
| Mg(OH)2.Ca(OH)$_2$ content | 0% | 2% |
| Aspect | Hard block | Presence of agglomerates |
| Caking score | 0/10 | 5/10 |

TABLE 8

| Example 4 | Blend K | Blend L |
|---|---|---|
| DATEM type | Multec Data 2720 S ™ | Multec Data 2720 S ™ |
| Basestock | Palm fat, hydrogenated | Palm fat, hydrogenated |
| Total carrier content | 20% w/w | 20% w/w |
| Natural CaCO$_3$ content | 18% | 18% w/w |
| MgO content | 2% | 2% |
| Aspect | Presence of small, soft agglomerates | Presence of small, soft agglomerates |
| Caking score | 7/10 | 8/10 |

What is claimed is:

1. A powdered composition comprising:
   a food surfactant selected from the group consisting of esters of alcohols, polyols, fatty acids, and mixtures thereof; and
   an anti-caking additive that comprises CaCO$_3$ and an oxide and/or hydroxide of magnesium and/or calcium, wherein said oxide and/or hydroxide of magnesium and/or calcium has a bulk density of 0.01 kg/l to 0.6 kg/l.

2. The composition according to claim 1, wherein said oxide and/or hydroxide of magnesium and/or calcium is present in an amount of at least 0.1% by weight of the total composition, and wherein said food surfactant is between 2-fold and 100-fold, by weight, the amount of said oxide and/or hydroxide of magnesium and/or calcium.

3. The composition according to claim 1, wherein said oxide and/or hydroxide of magnesium and/or calcium is selected from the group consisting of MgO, CaO, Mg(OH)$_2$, Ca(OH)$_2$, Mg(OH)$_2$.Ca(OH)$_2$, and a mixture thereof.

4. A method for preventing caking of a powdered composition comprising a food surfactant selected from the group consisting of esters of alcohols, polyols, fatty acids, and mixtures thereof, said method comprising adding to said powdered composition an anti-caking additive that comprises CaCO$_3$ and an oxide and/or hydroxide of magnesium and/or calcium, wherein said oxide and/or hydroxide has a bulk density of 0.01 kg/l to 0.6 kg/l, and CaCO$_3$.

5. The composition of claim 2, wherein said oxide and/or hydroxide of magnesium and/or calcium is present in an amount of at least 0.5% by weight of the total composition, and wherein said food surfactant is between 2-fold and 100-fold, by weight, the amount of said oxide and/or hydroxide of magnesium and/or calcium.

6. The composition of claim 2, wherein said oxide and/or hydroxide of magnesium and/or calcium is present in an amount of at least 1% by weight of the total composition, and wherein said food surfactant is between 2-fold and 100-fold, by weight, the amount of said oxide and/or hydroxide of magnesium and/or calcium.

7. The composition according to claim 1, wherein the oxide and/or hydroxide of magnesium and/or calcium has a bulk density lower than 0.35 kg/l and higher than 0.01 kg/l.

8. The composition according to claim 1, wherein the oxide and/or hydroxide of magnesium and/or calcium has a bulk density lower than 0.15 kg/l and higher than 0.01 kg/l.

9. The method of claim 4, wherein said oxide and/or hydroxide of magnesium and/or calcium is selected from the group consisting of MgO, CaO, Mg(OH)$_2$, Ca(OH)$_2$, Mg(OH)$_2$.Ca(OH)$_2$, and mixtures thereof.

10. The powdered composition of claim 1, wherein said food surfactant based on esters of alcohols, polyols and fatty acids is selected from the group consisting of diacetylated tartaric acid esters of monoglycerides (DATEM), diacetylated tartaric acid (DATA), sodium stearoyl lactylate (SSL), DATEM derivatives, DATA derivatives, SSL derivatives.

11. The powdered composition of claim 1, wherein said oxide of magnesium is MgO.

* * * * *

UNITED STATES PATENT AND TRADEMARK OFFICE
CERTIFICATE OF CORRECTION

PATENT NO. : 7,919,128 B2
APPLICATION NO. : 10/474094
DATED : April 5, 2011
INVENTOR(S) : Francois Heroufosse and Emmanuel Vanzeveren Page 1 of 1

It is certified that error appears in the above-identified patent and that said Letters Patent is hereby corrected as shown below:

Title page, Item 73, line 1, delete "Vennoostschap" and insert therefore, --Vennootschap--.

At column 4, line 63, delete "form" and insert therefore, --from--.

At column 5, line 9, delete "prefered" and insert therefore, --preferred--.

At column 5, line 35, delete "pannel" and insert therefore, --panel--.

At column 6, line 40, delete "form" and insert therefore, --from--.

Signed and Sealed this
Twelfth Day of February, 2013

Teresa Stanek Rea
*Acting Director of the United States Patent and Trademark Office*